Figure 1:
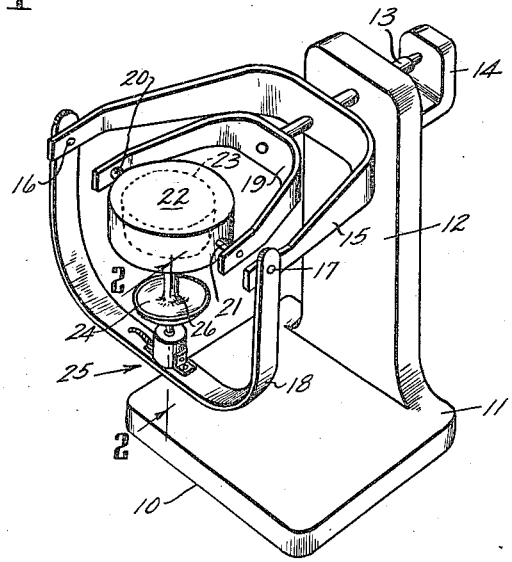

May 11, 1948.  J. KISSEL  2,441,157
CAGING MECHANISM FOR GYROSCOPES
Filed Jan. 10, 1947

INVENTOR.
JOSEPH KISSEL
BY Wade Koonty
Chester Tietig and
HIS ATTORNEYS

Patented May 11, 1948

2,441,157

UNITED STATES PATENT OFFICE 2,441,157

CAGING MECHANISM FOR GYROSCOPES

Joseph Kissel, Osborn, Ohio

Application January 10, 1947, Serial No. 721,337

6 Claims. (Cl. 74—5)

(Granted under the act of March 3, 1883, as amended April 30, 1928; 370 O. G. 757)

The invention described herein may be manufactured and used by or for the Government for governmental purposes without payment to me of any royalty thereon.

This invention relates to pendulous erecting and caging mechanism for gyroscopes, particularly those gyroscopes used in airplanes to indicate or to control the attitudes of airplanes in flight.

It is known that free gyroscopes cannot be used as attitude indicators unless they are continuously erected so that the spin axis of the gyro points to the center of the earth. On the other hand, pendulous gyroscopes, being subject to acceleration forces, are unreliable as attitude indicators during take off or turns of aircraft.

The spin axis of a free gyro may wander from true vertical after cut off of the driving power of the gyro upon the landing of the aircraft. In present jet propelled aircraft, the warm up time elapsing from starting the engine to take off, is of such short duration that the spin axis of a pendulously erected free gyroscope cannot be brought into the true vertical so that the gyro can be used as a reference during take off.

In accordance with the present invention, the advantages of employing a neutral or free gyro with a relatively weak pendulous erecting mechanism are retained and in order to maintain the gyro spin axis in the proper attitude with respect to the true vertical prior to take off of the airplane, the gyro is caged to a pendulum which always maintains the spin axis in the true vertical until the caging means is released. The pendulum employed in the caging mechanism is further employed as a control device for a friction erection means to erect the spin axis into the plane of the pendulum prior to automatic engagement of the caging means. The same pendulum is further employed as the control means for an electromagnetic erecting mechanism which is operative during flight of the aircraft.

In the preferred form of the present invention, a neutral or free gyroscope is mounted in gimbals and is provided with electrical or other conventional driving means. A hemispherical head or bell is provided at the lower end of the rotor shaft with the mass of the rotor, rotor shaft, driving means and the bell so positioned that the center of gravity of the system lies at the intersection of the gimbal axes. The bell can engage a friction plunger or pin which is carried on a pendulum having the form of a yoke and which is gimballed to have either one or two degrees of freedom. Rotation of the bell with the rotor shaft causes friction between the bell and the plunger which gives rise to a force causing rapid erection of the spin axis into the plane of the pendulum. When the vertical defined by the pendulum is attained by the spin axis, the spring pressed plunger will enter an orifice in the center of the bell and will remain there, holding the gyro in the apparent vertical until the plunger is withdrawn. Withdrawal of the plunger is done by means of a manually controlled electromagnet or solenoid just prior to take off of the aircraft on which the device is mounted.

For use during flight of the aircraft, the electromagnet employed for retraction of the friction erection plunger is utilized as the normally active erecting means. The electromagnet creates a field, the lines of force of which are cut by the hemispherical cup or bell as it rotates, which sets up eddy currents in the bell causing a drag equivalent to the effect of the friction plunger so that whenever the spin axis is non-coincident with the pendulum, the drag force produces an erecting moment tending to precess the spin axis into the plane of the pendulum in a known manner. By regulation of the current flow through the electromagnet, the erection effect may be made relatively weak so that the indicator operates as a free gyroscope with a slow acting erecting system which minimizes the effects of acceleration forces on the device in use.

One object of this invention is to provide a caging and erecting device which will hold the gyro in the plane of the apparent vertical until it is released, and which will return it slowly to the apparent vertical if it has departed therefrom after being released.

A further object is to provide a device giving an accurate reference immediately during the take off of an airplane.

A further object is to provide in a pendulous erecting mechanism for a free gyroscopic reference device means for rendering the gyroscope completely pendulous during periods of non use.

Still another object of the invention is the provision in a gyroscopic indicating device for aircraft, of a pendulum having means thereon to provide a weak erecting force during normal operation of the gyroscope, means for rapidly erecting the gyro spin axis into the plane of the pendulum and for rendering the gyro completely pendulous during periods of non-use.

Figure 2:
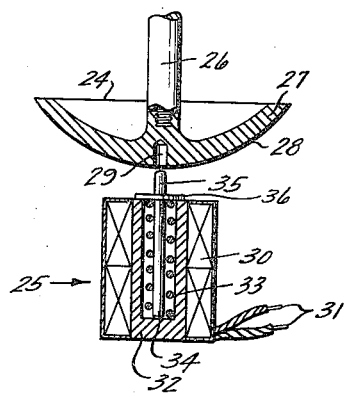

In the drawings:

Fig. 1 is a perspective view of a gyroscope provided with my pendulous caging mechanism; and Fig. 2 is a vertical section of an electromagnet which forms part of my device, and a vertical section of the gyro pendulum with which the electromagnet cooperates. The section is taken on the plane 2—2 of Fig. 1.

In Fig. 1, 10 is a base having a floor portion 11 and a wall portion 12 at a right angle to the base 10. The shaft 13 is revolubly mounted to the top of wall portion 12 and also through a lug 14 which provides the second bearing for the shaft 13. Mounted on the shaft 13 is a yoke 15 which carries at its extremities, by means of pins 16 and 17, a pendulum 18 in the form of a second yoke. At the inner extremity of the shaft 13 there is mounted a third yoke 19, between the extremities of which is mounted, by means of pins 20 and 21, a gyroscope 22. The rotor 23 of the gyro 22 is indicated by dashed lines. A bell 24 of generally inverted mushroom shape is secured to the lower end of a rotor shaft extension 26 and rotates with the latter. The weight distribution of the gyro 22 and the bell 24 is such that the gyro 22 still has its center of gravity at the intersection of the gimbal axes. The bell 24 lies in the plane passing through the pendulum, which plane also contains the axis of an electromagnet assembly generally indicated by 25. On the middle of the pendulum 18 is mounted an electromagnet 25.

As will be seen from Fig. 2, the bell 24 comprises a hemisphere 27 of non-magnetic metal such as aluminum, the lower surface 28 of which has a highly polished surface, and provided with a caging aperture 29 concentric with the axis of the rotor shaft 26.

The electromagnet generally indicated at 25 comprises a winding 30 which is supplied with direct current by conductors 31 from an outside source (not shown) which may be the standard 24 volt system of the airplane. A hollow, cylindrical iron core 32 contains a non-magnetic coil spring 33 which encircles a non-magnetic plunger 34. Attached to the top of shaft 34 is a soft magnetic iron armature including a pin 35 and a collar 36 which engages the extension spring 33.

*Operation*

The device in accordance with the invention operates as follows: Assuming that the parts are in the position as shown in Fig. 1, it is obvious that the mass of the yoke 18 and electromagnet assembly 25 can act as a pendulum having two degrees of rotational freedom, one about the axis of pivots 16 and 17 and the other about the pivotal axis 13. While the aircraft is on the ground, the plunger pin 35 is normally positioned within the aperture 29 of the bell 24 so that the gyroscope is locked or caged to the pendulum and the spin axis due to the influence of gravity on the pendulum will always be in the plane of the true vertical. When it is desired to place the instrument in operation prior to take off of the aircraft, the driving means for the rotor 23 of the gyro 22 is energized by means not shown such as completing the circuit to an electric motor forming part of the gyro. The gyro rotor is then brought up to speed and rotates about an axis coincident with the plane of the pendulum 18.

Just prior to take off, the electromagnet 25 is energized causing the caging pin 35 to be withdrawn from the aperture 29 in the bell 24 so that the gyroscope is now operating as a free gyro influenced only by the weak erection forces produced by the electromagnet 25. The electromagnet 25 produces a weak field extending beyond its confines and cut by the rotating bell 24 which produces eddy currents in the bell which create a resisting drag tending to resist rotation of the bell. As long as the field produced by electromagnet 25 is concentric with the bell, no erection forces are produced, but upon a deviation of the spin axis from the plane of the pendulum, the eddy current drag on the bell is off center from the spin axis and creates an erecting force or couple on the gyroscope in a manner per se known in the art. By regulation of the current in the electromagnet 25, the erecting forces produced by eddy currents in the hemispherical bell 24 can be made relatively weak so that the erection force will be slow and therefore during periods of high linear acceleration or in turns of the aircraft, the gyro will operate substantially as a free gyroscope and in normal flight the electromagnetic erection tends to maintain the spin axis in the plane of the average true vertical.

After the aircraft has landed, the electromagnet 25 is deenergized and immediately the spring 33 forces the caging pin 35 into frictional contact with the peripheral surface 28 of the hemispherical bell 24. If the caging aperture 29 is not in alignment with the pin 35, the friction force produced on the bell off center from the spin axis creates an erecting force on the gyroscope which can be made very strong by proper regulation of the strength of the spring 33 so that within a brief period of time the axis of the aperture 29 is coincident with the axis of pin 35 and the pin will enter the aperture to cage the gyroscope directly to the pendulum. The driving source for the gyro 22 may then be deenergized and thereafter the spin axis of the gyro will always be maintained by means of the pendulum 18 into the plane of the true vertical so that the instrument can at any time be placed in operation in the manner above described.

It will be seen that in accordance with the present invention, I have devised a gyroscopic instrument for indicating the attitude of an aircraft which has all the advantages of a free gyro with a weak pendulous erecting system for use in normal flight. It does not, however, have the disadvantages of the usual free gyro when on the ground, since in accordance with my invention, the spin axis is always maintained in the plane of the true vertical until it is desired to place the instrument in condition for flight indication.

While a preferred embodiment of the invention has been illustrated and described, various modifications and changes therein will become apparent to those skilled in the art as falling within the scope of the invention as defined in the appended claims.

The invention claimed is:

1. In a gyroscopic indicating device for aircraft, a gyroscope of the free type, a bell depending from said gyroscope and rotatable therewith, a pendulum in the form of a yoke disposed about said gyroscope, means on the pendulum for providing a weak erecting force in cooperation with said bell during normal operation of the gyroscope, means associated with said weak erecting means for rapidly erecting the gyro spin axis into the plane of the pendulum and for rendering the gyroscope completely pendulous during periods of non-use.

2. In combination, a gyroscope of the non-pendulous type, an inner and an outer gimbal therefor, a bell depending from said gyroscope and rotatable in synchronism therewith, said bell having an external central orifice, a caging pendulum depending from said outer gimbal, an electromagnet at the middle point of said caging pendulum, a pin controlled by said electromagnet and spring means in said electromagnet to bring said pin into frictional contact with said bell whereby to erect said gyro and to lock the gyro in erect position by entering said orifice under the urging of said spring means.

3. In combination with a gyroscope of the non-pendulous type, a bell suspended therefrom and rotatable at the same rate therewith, said bell having a central orifice, an inner gimbal supporting said gyroscope, an outer gimbal, and a yoke-shaped pendulum suspended from the extremities of said outer gimbal, an electromagnet in the middle point of the pendulum, a core in said magnet, a non-magnetic coil spring in said core, a soft iron pin retractable toward said core when said magnet is energized and adapted to contact the lower surface of said bell when the electromagnet is not energized whereby said pin will precess the gyro by exerting a drag on said bell to erect said gyro, and eventually lock the gyro in zero position by entering said central orifice in the bell.

4. In combination, an attitude-indicating gyroscope of the non-pendulous type, an inverted hemispherical bell depending from said gyroscope and rotatable therewith, a pendulous caging mechanism, said mechanism including a caging pendulum of yoke shape, an electromagnet mounted on said pendulum, an armature including a pin controllable by said electromagnet to retract the pin when said electromagnet is energized and when it is not energized to contact the lower surface of the bell and by friction precess the gyroscope to an erect position, said electromagnet being also of sufficient magnetic strength and so disposed as to induce in said bell, when the latter is rotating, eddy currents capable of gradually erecting said gyroscope.

5. In combination with a gyroscope of the non-pendulous type, a bell suspended therefrom and rotating therewith, said bell being made of non-magnetic metal and having a central orifice, an inner gimbal supporting said gyroscope, an outer gimbal, a yoke-shaped pendulum suspended from the extremities of said outer gimbal, an electromagnet in the middle point of said pendulum, a core in said magnet, a non-magnetic shaft in said core, a soft iron pin at the outer end of said non-magnetic shaft, a collar on the inner end of said pin, a non-magnetic coil spring in said core surrounding said shaft and bearing on said collar, said electromagnet being of sufficient magnetic strength and so nearly disposed to said bell as to gradually erect said gyroscope magnetically by inducing eddy currents in said bell when the latter is rotating, said spring being mechanically strong enough to rapidly erect the gyroscope by contacting the outer surface of said ball by the outer tip of said pin, to cause mechanical drag on said bell.

6. In combination, a gyroscope of the free or neutral type, a hemispherical inverted bell depending from its spin axis and rotatable with said gyroscope, said bell being of insufficient weight to make the gyroscope pendulous, a gimbaled mounting for said gyroscope, a pendulum in the form of a yoke, a gimbaled mounting from which said pendulum is suspended, a common axis of suspension and rotation for said gyroscope mounting and said pendulum mounting, a combined electromagnetic and mechanical erecting and caging device mounted on the middle portion of said yoke-shaped pendulum, said bell having an orifice adapted to cooperate therewith, a pin controllable by the mechanical part of said device to bring about mechanically the erection of said gyro by applying a precessing drag to said bell, the electromagnetic part of said device having enough field strength and being so positioned as to induce eddy currents in said bell when the latter is rotating and thereby create an electromagnetic drag, said drag being sufficient to gradually bring the bell into a position to enable said pin to precess and eventually lock said gyro and said pendulum together to render said gyro pendulous by entering said orifice.

JOSEPH KISSEL.

REFERENCES CITED

The following references are of record in the file of this patent:

UNITED STATES PATENTS

| Number | Name | Date |
| --- | --- | --- |
| 2,297,265 | Von Manteuffel | Sept. 29, 1942 |

FOREIGN PATENTS

| Number | Country | Date |
| --- | --- | --- |
| 364,625 | Great Britain | Dec. 29, 1931 |